Aug. 24, 1937.  G. A. RAWLINS  2,091,013
APPARATUS FOR HEATING LIQUIDS
Filed May 7, 1936  2 Sheets-Sheet 1

George Arthur Rawlins
INVENTOR

Aug. 24, 1937.   G. A. RAWLINS   2,091,013
APPARATUS FOR HEATING LIQUIDS
Filed May 7, 1936   2 Sheets-Sheet 2

George Arthur Rawlins
INVENTOR

By Otto Munk
his ATT'Y.

Patented Aug. 24, 1937

2,091,013

UNITED STATES PATENT OFFICE 2,091,013

APPARATUS FOR HEATING LIQUIDS

George Arthur Rawlins, Burton-on-Trent, England, assignor to Robert Morton & Company, Limited, Burton-on-Trent, England Application May 7, 1936, Serial No. 78,377
In Great Britain May 9, 1935

9 Claims.  (Cl. 257—203)

This invention relates to apparatus for heating liquids, of the kind comprising a vessel, means for heating liquid in said vessel, a hood disposed within the vessel and above said heating means, the normal level of the liquid in said vessel being intermediate the top and bottom of said hood, and a baffle or deflector mounted above an opening in the top of the latter.

Apparatus of the above kind is usually employed for heating wort during the manufacture of beer, the present invention being particularly concerned with apparatus for this purpose.

The baffle or deflector aforesaid is intended to deflect the heated liquid which passes upwardly through the hood and to direct it in the form of a spray over the surface of the liquid in the vessel. The hops which are added to the heated wort during the manufacture of beer are treated in the above manner with a continuous shower of hot wort as they float on the surface of the latter, and the completeness of the infusion depends largely upon the effectiveness of this part of the apparatus.

In apparatus for the heating of wort as hitherto proposed, the baffle or deflector comprises a somewhat concave plate which is supported above the neck of the hood so that the wort issuing from the latter is deflected in a downward and outward direction on to the surface of the wort in the vessel itself.

It is found that a baffle or deflector so constructed has the disadvantage that, in a case where the heating vessel is of large diameter, the spray of heated liquid discharged from the baffle or deflector does not generally reach that part of the surface of the liquid which lies adjacent to the walls of the vessel with the result that some time elapses before the hops which lie on this part of the surface are incorporated in the wort for the boiling operations. This is especially the case where there is a relatively small depth of wort in the heating vessel, or where the amount of evaporation required is small.

The chief object of the present invention is to provide an improved construction of apparatus in which the above disadvantage is obviated.

Referring to the drawings:—

Figure 1:
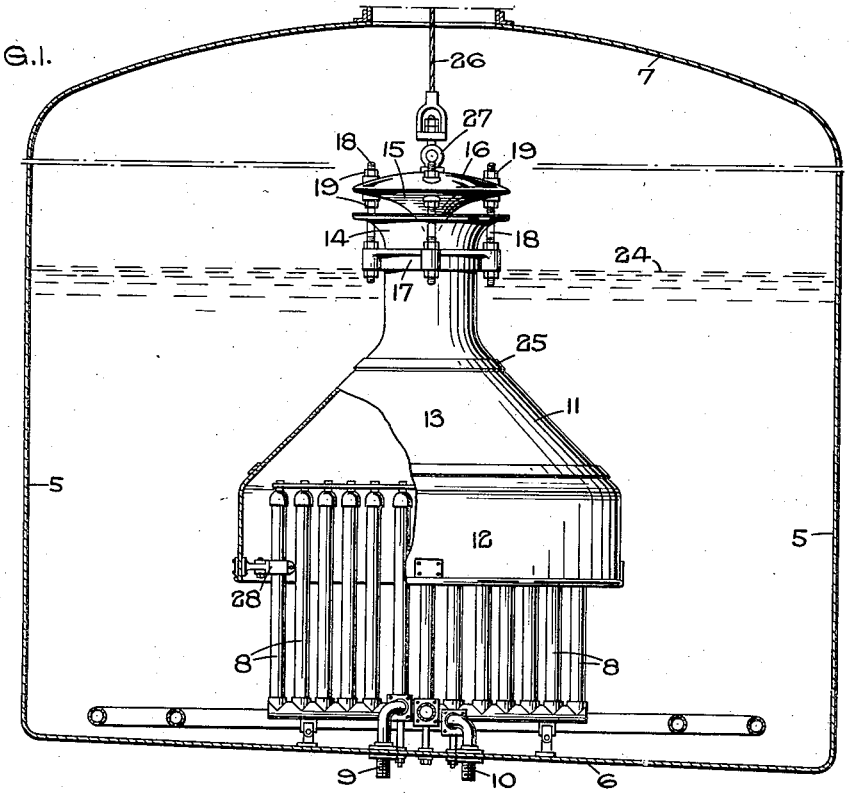
Figure 1 is a part-sectional side elevation of one form of apparatus embodying the present invention.

In the construction illustrated in Figure 1, which is especially suitable for heating wort in the manufacture of beer, the apparatus comprises a vessel or copper 5 which may be of circular section with a substantially flat base 6 and is closed at the top by a domed cover 7. A heating element in the form of a plurality of vertically disposed steam pipes 8, 8 is supported centrally of the base 6 in the lower part of the vessel 5, the steam inlet and outlet pipes 9 and 10, respectively, extending through the base 6. There may be a single rank of steam pipes 8, 8 disposed in one plane, or the pipes may be arranged in several ranks set radially of the vessel 5 as shown, or in any other suitable manner. All the above parts may be substantially of known construction.

Over the heater is mounted a hollow hood 11 having a lower cylindrical part 12, a central conical part 13 and a substantially cylindrical neck 14, the hood being open at its upper and lower ends.

In operation, the liquid heated by the steam pipes 8, 8 passes upwardly through the hood 11 and is discharged from the neck 14 of the latter against the underside of a baffle or deflector 15 which is mounted above the hood 11.

This baffle or deflector 15 is essentially of inverted conical form, and is mounted with its periphery spaced above the upper end of the neck 14 and with the apex of the cone projecting into the latter.

Figure 2:
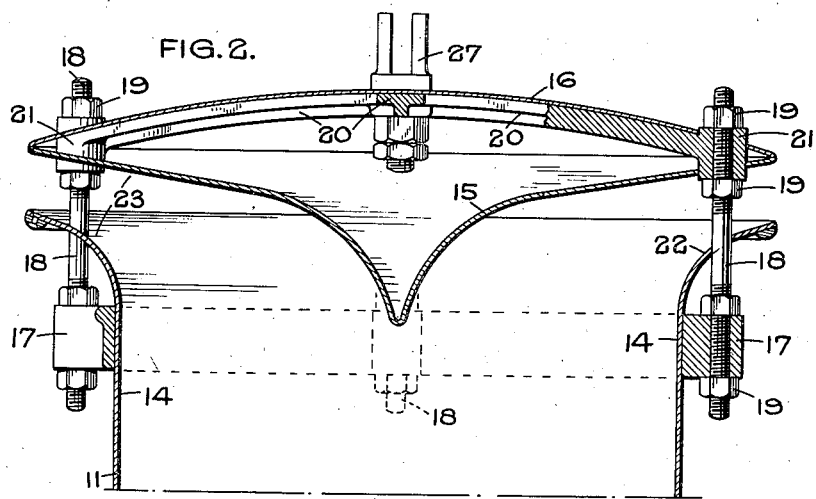
Figure 2 is a vertical section, to an enlarged scale, of a part of the apparatus shown in Figure 1.

The walls of this conical baffle or deflector are preferably somewhat concave between the apex and periphery thereof as shown in Figure 2: that is to say, the cross section of the cone forms a V whose sides are curved inwardly.

The baffle or deflector may be formed with a flat or domed upper surface 16, and its diameter may be somewhat greater than that of the cylindrical neck 14 of the hood 11 to which it is rigidly attached.

In a convenient method of mounting the baffle or deflector, a ring 17 is secured around the neck 14 adjacent the upper end thereof, this ring 17 carrying upwardly extending columns which pass through the edge of the baffle or deflector 15. These columns may comprise studs 18, 18 and the periphery of the baffle or deflector may be engaged between nuts 19, 19 screwed thereon.

The baffle or deflector 15 may be of solid construction, but preferably it is formed by welding or otherwise securing together the peripheries of two circular plates as shown, the upper being flat or domed and the lower of inverted conical form. Within the baffle or deflector may be arranged a cast metal or other spider which supports the upper plate and has a plurality of radial arms 20, 20, the ends of which may be formed with bosses 21, 21 disposed adjacent the peripheries of the plates and projecting therethrough. These bosses 21, 21 may be drilled or otherwise formed for attachment to the supporting studs 18, 18 or columns aforesaid.

The upper end of the neck 14 on the hood 11 may be outwardly flared or otherwise of inverted conical form as at 22, its rim being of substantially the same diameter as the baffle or deflector 15. The arrangement preferably is such that the cross-sectional area of the annular passage 23 between the neck 14 and the baffle or deflector 15 diminishes gradually towards the periphery of the latter. The outwardly extending portion of the neck 14 may be substantially parallel to the marginal portion of the baffle or deflector 15.

The hot liquid which passes up through the neck 14 of the hood 11 impinges on the inverted conical underside of the baffle or deflector 15 and is thus discharged in an upward and outward direction, the coned or flared upper end of the neck 14 assisting in this. The effect is enhanced by arranging the adjacent surfaces of the baffle and the neck in the manner above described, so that the velocity of the liquid is increased as it passes between the converging walls of the annular passage 23.

If desired, means may be provided for raising or lowering the baffle or deflector 15 in relation to the neck 14 of the hood 11 and thus increasing or decreasing the cross-sectional area at the outlet end of the annular passage 23. Such adjustment is conveniently effected by means of the nuts 19, 19 on the supporting studs aforesaid.

The upward and outward direction of discharge causes the spray of hot liquid to be thrown to a greater distance than is possible with the concave baffles hitherto employed, which merely deflect the liquid downwardly. The improved baffle or deflector can thus be arranged to discharge hot liquid over the whole surface 24 of the liquid in the copper or vessel 5, irrespective of the diameter of the latter.

The upper cylindrical portion 14 which forms the neck of the hood 11 may be constructed separately with respect to the lower conical portion 13 of the latter, and it may be suitably flanged as at 25 for connection thereto.

In order that the hood 11 or the neck 14 thereof may be adjusted up and down to suit different levels of the liquid in the copper or vessel 5, the baffle or deflector 15 may be suspended by a chain or cable 26 attached to a ring or loop 27 which is formed or provided on its upper surface 16. The lower portion 12 of the hood 11 which surrounds the heating element may be provided internally with hinged clips such as 28 which embrace the adjacent steam pipes 8, 8 and may be tightened to retain the hood 11 in its adjusted position.

Figure 3:
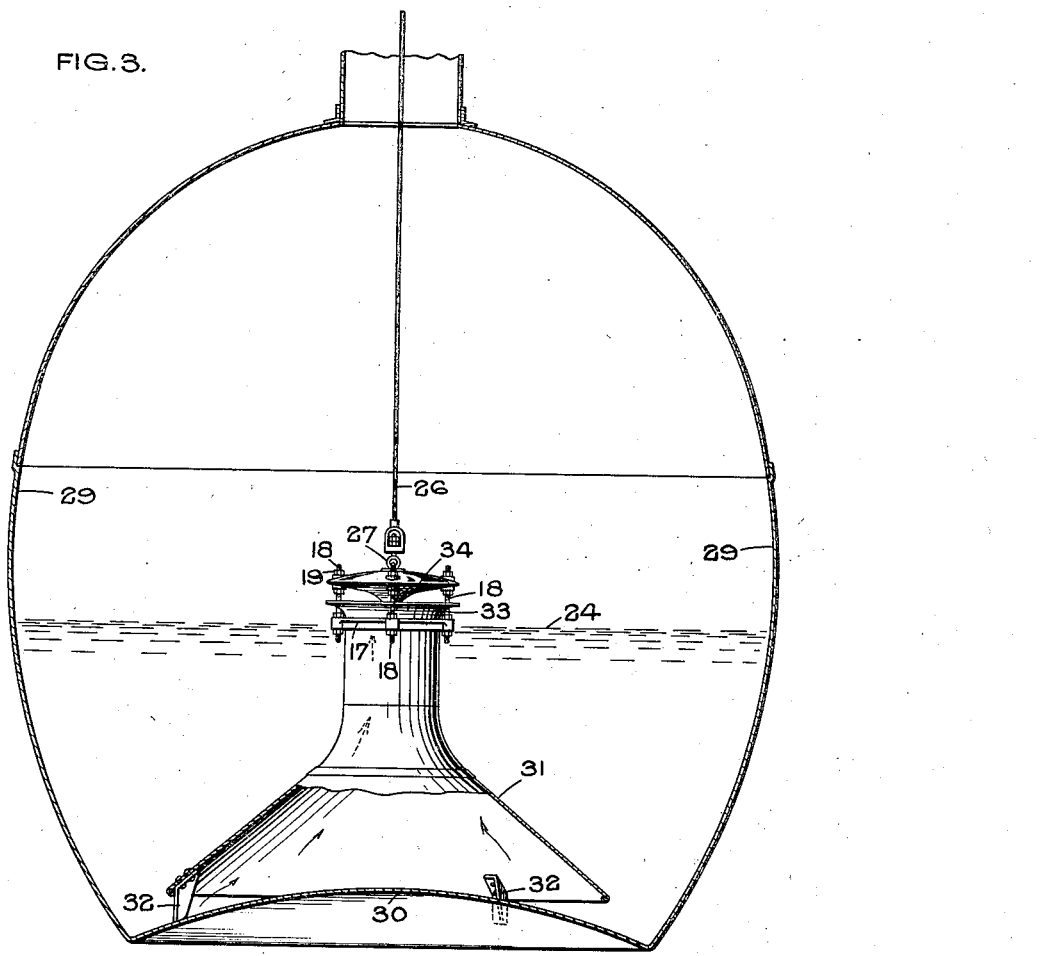
Figure 3 is a sectional side elevation of another form of apparatus embodying the invention.

The improved form of baffle or deflector hereinbefore described may be employed with equal advantage in connection with vessels which are heated externally instead of having an internal heating element. By way of example, Figure 3 shows a fire-heated copper 29 having a domed base 30 above which is supported a conical hood or fountain 31, the latter having a plurality of short legs 32, 32 at its periphery which rest on the base 30 of the copper. The hood is formed with a cylindrical neck 33 extending above the liquid level, a baffle or deflector 34 of inverted conical form being mounted over said neck. This baffle or deflector and the upper part of the neck 33 which co-operates therewith may be arranged exactly as in the previous construction.

The invention may also be applied to coppers which are steam-jacketed at the base, and in this case the base of the copper may be of dished form.

Furthermore, a hood and baffle constructed as above described may be used with fired or steam-jacketed vessels which also have an internal tubular heating element arranged below the hood.

What I claim is:—

1. Apparatus for heating liquids comprising a vessel, means associated with said vessel for heating liquid therein, a hood disposed within said vessel and above said heating means, the normal level of liquid in said vessel being intermediate the top and bottom of said hood, an open circular neck at the top of said hood, and a baffle or deflector of inverted conical form mounted above said neck, the undersurface of said baffle having a continuous upward inclination from its apex to its periphery so that liquid striking it is directed upwardly and outwardly in the form of a spray which extends over the whole surface of the liquid in said vessel.

2. Apparatus for heating liquids comprising a vessel for containing liquid, a hood disposed within said vessel and extending below the normal level of the liquid therein, heating means below and partly within said hood, said hood being adjustably supported upon said heating means, an open circular neck at the top of said hood, and a baffle or deflector of inverted conical form mounted above said neck, the undersurface of said baffle having a continuous upward inclination from its apex to its periphery so that liquid striking it is directed upwardly and outwardly in the form of a spray which extends over the whole surface of the liquid in said vessel.

3. Apparatus for heating liquids comprising a vessel, vertical steam pipes within said vessel for heating liquid therein, a hood disposed above and around said steam pipes, the normal level of liquid in said vessel being intermediate the top and bottom of said hood, clamps on said hood engaging some of said steam pipes and adjustable longitudinally thereof, an open circular neck at the top of said hood, and a baffle or deflector of inverted conical form mounted above said neck, the undersurface of said baffle having a continuous upward inclination from its apex to its periphery so that liquid striking it is directed upwardly and outwardly in the form of a spray which extends over the whole surface of the liquid in said vessel.

4. Apparatus for heating liquids comprising a vessel, vertical steam pipes within said vessel for heating liquid therein, a hood suspended above and extending around said steam pipes, means for varying the height of said hood above said steam pipes, the normal level of liquid in said vessel being intermediate the top and bottom of said hood, clamps on said hood slidable longitudinally of said steam pipes and adapted to secure said hood in its adjusted position, an open circular neck at the top of said hood, and a baffle or deflector of inverted conical form mounted above said neck, the undersurface of said baffle having a continuous upward inclination from its apex to its periphery so that liquid striking it is directed upwardly and outwardly in the form of a spray which extends over the whole surface of the liquid in said vessel.

5. Apparatus for heating liquids comprising a vessel for containing liquid, heating means disposed within said vessel, a hood having a skirt surrounding said heating means and depending below the normal level of liquid in said vessel, an open circular neck at the top and a conical portion connecting said skirt and neck, and a baffle or deflector of inverted conical form mounted above said neck, the undersurface of said baffle having a continuous upward inclination from its apex to its periphery so that liquid striking it is directed upwardly and outwardly in the form of a spray which extends over the whole surface of the liquid in said vessel.

6. Apparatus for heating liquids comprising a vessel, means associated with said vessel for heating liquid therein, a hood disposed within said vessel and above said heating means, the normal level of liquid in said vessel being intermediate the top and bottom of said hood, an open circular neck at the top of said hood, a baffle or deflector of inverted conical form supported upon said neck, and means for varying the height of said baffle above said neck, the undersurface of said baffle having a continuous upward inclination from its apex to its periphery so that liquid striking it is directed upwardly and outwardly in the form of a spray which extends over the whole surface of the liquid in said vessel.

7. Apparatus for heating liquids comprising a vessel, means associated with said vessel for heating liquid therein, a hood disposed within said vessel and above said heating means, the normal level of liquid in said vessel being intermediate the top and bottom of said hood, an open circular neck at the top of said hood, a ring secured around said neck, screwed columns projecting upwardly from said ring, a baffle or deflector of inverted conical form through which said columns pass, and nuts on said columns for adjustably securing said baffle thereon, the undersurface of said baffle having a continuous upward inclination from its apex to its periphery so that liquid striking it is directed upwardly and outwardly in the form of a spray which extends over the whole surface of the liquid in said vessel.

8. Apparatus for heating liquids comprising a vessel, means associated with said vessel for heating liquid therein, a hood disposed within said vessel and above said heating means, the normal level of liquid in said vessel being intermediate the top and bottom of said hood, an open circular neck at the top of said hood, a baffle or deflector mounted above said neck, said baffle including a bottom plate of inverted conical form and having its undersurface inclined continuously upwards from its apex to its periphery, so that liquid striking it is directed upwardly and outwardly in the form of a spray which extends over the whole surface of the liquid in said vessel, a top plate whose edges are secured to those of said bottom plate, and a stiffening member between said plates.

9. Apparatus for heating liquids comprising a vessel, means associated with said vessel for heating liquid therein, a hood disposed within said vessel and above said heating means, the normal level of liquid in said vessel being intermediate the top and bottom of said hood, an open circular neck at the top of said hood, the upper end of said neck being in the form of an inverted cone, and a baffle or deflector mounted above said neck and in the form of an inverted cone of greater angle than the upper end of said neck, the opposing faces of said baffle and neck being inclined continuously upwards and outwards to their outer peripheries, so that heated liquid after passing upwardly through said neck is discharged through the convergent annular passage between said faces in the form of a spray which extends over the whole surface of the liquid in said vessel.

GEORGE ARTHUR RAWLINS.